US009241199B2

United States Patent
Abe et al.

(10) Patent No.: US 9,241,199 B2
(45) Date of Patent: Jan. 19, 2016

(54) ANNOUNCEMENT BROADCASTING SYSTEM, ANNOUNCEMENT BROADCASTING OPTICAL RECEIVER USED FOR THE ANNOUNCEMENT BROADCASTING SYSTEM, CABLE TELEVISION BROADCASTING SYSTEM, AND OPTICAL RECEIVER USED FOR THE CABLE TELEVISION BROADCASTING SYSTEM

(75) Inventors: Masayuki Abe, Amagasaki (JP); Shuzo Imai, Okayama (JP); Tetsuya Miki, Chofu (JP)

(73) Assignees: MITSUBISHI CABLE INDUSTRIES, LTD., Tokyo (JP); Shuzo Imai, Okayama (JP)

( * ) Notice: Subject to any disclaimer, the term of this patent is extended or adjusted under 35 U.S.C. 154(b) by 2320 days.

(21) Appl. No.: 12/029,417

(22) Filed: Feb. 11, 2008

(65) Prior Publication Data

US 2009/0204988 A1 Aug. 13, 2009

(51) Int. Cl.
*H04N 7/10* (2006.01)
*H04N 21/81* (2011.01)
(Continued)

(52) U.S. Cl.
CPC .............. *H04N 21/814* (2013.01); *H04N 7/20* (2013.01); *H04N 21/4436* (2013.01); *H04N 21/4882* (2013.01); *H04N 21/8146* (2013.01); *H04H20/59* (2013.01); *H04H 20/69* (2013.01); *H04N 7/10* (2013.01)

(58) Field of Classification Search
CPC .................................................... H04N 21/814
USPC ....................... 725/32–36, 135, 139, 143, 151
See application file for complete search history.

(56) References Cited

U.S. PATENT DOCUMENTS

| 5,708,961 A * | 1/1998 | Hylton et al. .................... 725/81 |
| 2009/0205007 A1* | 8/2009 | Woodward ..................... 725/129 |
| 2010/0088718 A1* | 4/2010 | Hasek et al. .................... 725/33 |

FOREIGN PATENT DOCUMENTS

| JP | 09-162825 A | 6/1997 |
| JP | 2002-300108 A | 10/2002 |

(Continued)

OTHER PUBLICATIONS

Machine translation of Japanese Patent Publication #2007-081874.*

(Continued)

*Primary Examiner* — Jun Fei Zhong
(74) *Attorney, Agent, or Firm* — Roberts Mlotkowski Safran & Cole P.C.

(57) ABSTRACT

In a subscriber's facility of an announcement broadcasting system utilizing an optical fiber cable TV network, an announcement broadcasting optical receiver receiving an optical transmission signal of audio information and outputting an audio information electric signal for an announcement broadcasting terminal is provided. The announcement broadcasting optical receiver includes: a photo-detection section for converting the optical transmission signal into the audio information electric signal; a photoelectric conversion section, which is connected to the photo-detection section, for converting the optical transmission signal that the photo-detection section receives into electric energy; and an RF signal potential transformation section, to which the electric energy obtained by the photoelectric conversion section is supplied, for potential-transforming the audio information electric signal output from the photo-detection section to one at an input voltage level appropriate to the announcement broadcasting terminal and outputting it.

8 Claims, 7 Drawing Sheets

(51) Int. Cl.
*H04N 7/20* (2006.01)
*H04N 21/443* (2011.01)
*H04N 21/488* (2011.01)
*H04H 20/59* (2008.01)
*H04H 20/69* (2008.01)

(56) References Cited

FOREIGN PATENT DOCUMENTS

| JP | 2002-368807 A | 12/2002 |
| JP | 2004-129175 A | 4/2004 |
| JP | 2005-94310 A | 4/2005 |
| JP | 2005-184700 A | 7/2005 |
| JP | 2006-121729 A | 5/2006 |
| JP | 2007-81874 A | 3/2007 |
| JP | 2007-81875 A | 3/2007 |
| JP | 2007081874 | * 3/2007 |
| JP | 2007288384 | * 11/2007 |

OTHER PUBLICATIONS

Machine translation of Japanese Patent Publication #2007-288384.*
Office Action issued by Japanese Patent Office in corresponding Japanese Patent Application No. 2006-111547 dated Oct. 27, 2009.

* cited by examiner

ANNOUNCEMENT BROADCASTING SYSTEM, ANNOUNCEMENT BROADCASTING OPTICAL RECEIVER USED FOR THE ANNOUNCEMENT BROADCASTING SYSTEM, CABLE TELEVISION BROADCASTING SYSTEM, AND OPTICAL RECEIVER USED FOR THE CABLE TELEVISION BROADCASTING SYSTEM

BACKGROUND OF THE INVENTION

1. Field of the Invention

The present invention relates to measures to attain power supply at outage in a receiving side facility of a cable television broadcasting system using an optical fiber.

2. Description of Related Art

As known in Patent Document 1 to Patent Document 3, systems have recently been a focus of attention which broadcast announcement of various kinds of information through a cable television network in local communes and the like.

For example, as shown in FIG. 7, in a head end 10 of a network in a cable television broadcasting system using an optical fiber, an output mixer 170 mixes an audio information signal (70 to 90 MHz, for example) with a wavelength-multiplexed TV image signal (90 to 770 MHz, for example) to generate a broadband TV electric signal (70 to 770 MHz), and then an optical transmitter 180 converts the thus generated electric signal into an optical transmission signal in a predetermine wavelength band (1310-mn band or 1550-nm band, for example) and is sent it out to an optical transmission line 300 of a long distance formed of a single-mode optical fiber cable.

In each of subscriber's facilities 400, an optical receiver 500 receives the optical transmission signal transmitted through the transmission line 300 and coverts it into a TV electric signal (an RF signal) to output it. The thus output TV electric signal is input into a TV set 430 via a set-top box 420. Wherein, an AC power source environment 440 supplies electric power to the optical receiver 500 as well as to the set-top box 420 and the TV set 430.

Announcement broadcasting through such a network is performed in such a manner that the TV electric signal output from the optical receiver 500 is divided by a distributor 600 and an audio information signal is extracted from the thus divided TV electric signal by an announcement broadcasting terminal 460, such as an FM radio.

Patent Document 1: Japanese Unexamined Patent Application Publication 2002-368807 (page 5, FIG. 1)
Patent Document 2: Japanese Unexamined Patent Application Publication 2005-184700 (pages 5 to 7, FIG. 2)
Patent Document 3: Japanese Unexamined Patent Application Publication 2005-94310 (pages 2 to 3, FIG. 7 to FIG. 10)

SUMMARY OF THE INVENTION

In the above conventional case, however, the optical receiver 500 of each subscriber's facility 400 does not work during outage, and therefore, the subscribers cannot receive the announcement broadcasting services in an emergency, such as a disaster.

Although a battery for supplying the electric power to the optical receiver 500 may be provided permanently in the subscriber's facility 400 for tackling this problem, the battery must be exchanged every two to three years to involve much cost.

The present invention has been made in view of the foregoing and has its principal object of allowing elements, such as an announcement broadcasting optical receiver of subscriber's facilities in an announcement broadcasting system utilizing an optical fiber cable TV network to be operated appropriately even in outage.

In order to attain the above object, the present invention focuses attention on the fact that an optical transmission signal has energy, and is devised to allow elements, such as an announcement broadcasting optical receiver and the like to be operated with electric energy into which the optical transmission signal is converted.

Specifically, the present invention provides an announcement broadcasting system including: a network center sending facility which sends out an optical transmission signal into which a TV electric signal obtained by mixing a TV image signal and an audio information signal by a mixer is converted by a TV optical transmitter and which sends out an optical transmission signal obtained by dividing by a distributor and then converting by an audio information optical transmitter the audio information signal input in the mixer; an optical transmission line which transmits the transmission signals sent out from the TV optical transmitter and the audio information optical transmitter of the network center sending facility; and at least one subscriber's facility which receives the optical transmission signal transmitted from the TV optical transmitter through the optical transmission line to output a TV electric signal, which outputs to an announcement broadcasting terminal an audio information electric signal into which the optical transmission signal transmitted from the audio information optical transmitter through the optical transmission line is converted by an announcement broadcasting optical receiver for performing announcement broadcasting. Wherein, the announcement broadcasting optical receiver includes: a photo-detection section for converting the optical transmission signal sent out from the audio information optical transmitter of the network center sending facility into the audio information electric signal; a photoelectric conversion section, which is connected to the photo-detection section, for converting the optical transmission signal that the photo-detection section receives into electric energy; and an RF signal potential transformation section, to which the electric energy obtained by the photoelectric conversion section is supplied, for potential-transforming the audio information electric signal output from the photo-detection section to one at an input voltage level appropriate to the announcement broadcasting terminal and outputting it.

The present invention provides, as an announcement broadcasting optical receiver which is provided in a subscriber's facility for an announcement broadcasting system which performs announcement broadcasting by inputting an optical transmission signal transmitted through an optical transmission line into an announcement broadcasting terminal, and which receives an optical transmission signal into which an audio information signal in an FM frequency band is converted and outputs an audio information electric signal in the FM frequency band, an announcement broadcasting optical receiver, an announcement broadcasting optical receiver includes: a photo-detection section for converting the optical transmission signal into the audio information electric signal in the FM frequency band; a photoelectric conversion section, which is connected to the photo-detection section, for converting the optical transmission signal that the photo-detection section receives into electric energy; and an RF signal potential transformation section, to which the electric energy obtained by the photoelectric conversion section is supplied, for potential-transforming the audio information electric signal in the FM frequency band output from the photo-detection section to one at an input voltage level appropriate to the announcement broadcasting terminal and outputting it. In the above announcement broadcasting optical receiver, the FM frequency band may ranges between 70 and 90 MHz.

The present invention further provides a cable TV broadcasting system including: a sending side facility including an optical transmitter for converting a TV electric signal obtained by mixing an image signal and an audio signal into an optical transmission signal and outputting it; an optical transmission line for transmitting the optical transmission signal sent out from the sending side facility; and at least one receiving side facility including an optical receiver for converting the optical transmission signal transmitted through the optical transmission line into a TV electric signal and outputting it. Wherein, the optical receiver of the receiving side facility includes a photoelectric conversion section for converting the optical transmission signal that the optical receiver receives into electric energy so as to be operated with the electric energy obtained by the photoelectric conversion section.

In the above cable TV broadcasting system, the receiving side facility may be a subscriber's facility including, in addition to the optical receiver, a TV set for regenerating an image and a sound on the basis of the TV electric signal output from the optical receiver, and the TV set may be operated with the electric energy obtained by the photoelectric conversion section of the optical receiver.

In reverse, in the above cable TV broadcasting system, the receiving side facility may be community facility including, in addition to the optical receiver, a sender for sending the TV electric signal output from the optical receiver to a plurality of subscriber's facilities, and the sender may be operated with the electric energy obtained by the photoelectric conversion section of the optical receiver.

Further, as an optical receiver for the above cable TV broadcasting system, an optical receiver may includes: a photo-detection section for converting an optical transmission signal into a TV electric signal; a photoelectric conversion section, which is connected to the photo-detection section, for converting the optical transmission signal that the photo-detection section receives into electric energy; and an RF signal potential transformation section, to which the electric energy obtained by the photoelectric conversion section is supplied, for potential-transforming the TV electric signal output from the photo-detection section to one at an appropriate voltage level and outputting it.

DESCRIPTION OF THE PREFERRED EMBODIMENTS

Embodiments of the present invention will be described below with reference to the drawings.

Embodiment 1

Figure 1:
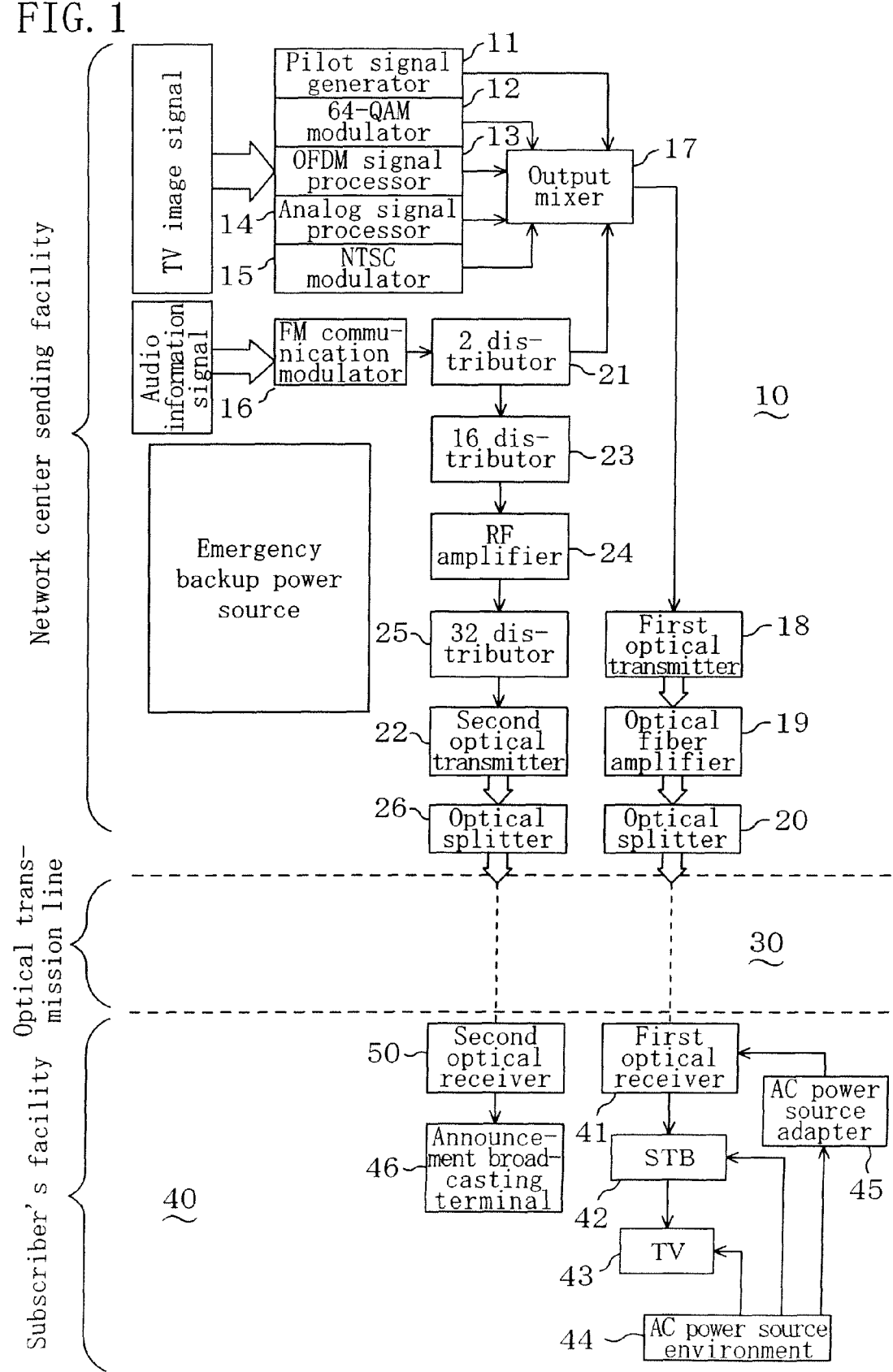
FIG. 1 is a block diagram showing a whole construction of an announcement broadcasting system in accordance with Embodiment 1 of the present invention.

FIG. 1 shows a whole construction of an announcement broadcasting system in accordance with Embodiment 1 of the present invention, which is built by utilizing a CATV (cable television) network using an optical fiber cable.

The announcement broadcasting system includes a network center sending facility 10, an optical transmission line 30, and a plurality of subscriber's facilities 40. The network center sending facility 10 sends out a TV optical transmission signal obtained by mixing a TV image signal (a ground wave digital TV signal, a BS signal, a CS signal, or the like) and an audio information signal (a TV audio signal, an FM radio broadcasting audio information signal, an announcement broadcasting audio information signal, or the like). The optical transmission line 30, which is formed of a single- or two-core optical fiber, transmits the optical transmission signal sent out from the network center sending facility 10. The subscriber's facilities 40 perform various kinds of TV broadcasting and radio broadcasting by receiving the optical transmission signal transmitted through the optical transmission line 30. Wherein, FIG. 1 shows only one subscriber's facility 40.

The network center sending facility 10 includes various kinds of modulators for modulating the TV image signal input through an antenna or the like, such as a pilot signal generator 11, a 64-QAM modulator 12, an OFDM signal processor 13, an analog signal processor 14, an NTSC modulator 15, and the like. The frequency band of the TV image signal ranges between 90 and 770 MHz, for example. The network center sending facility 10 further includes an FM communication modulator 16 for modulating the audio information signal input through an antenna or the like. The frequency band of the audio information signal ranges between 70 and 90 MHz, for example.

On the output side of the modulators 11 to 16, an output mixer 17 for mixing the output signals of the modulators 11 to 16 and outputting a TV electric signal is provided. A first optical transmitter 18 as a TV optical transmitter for converting the TV electric signal output from the output mixer 17 into an optical transmission signal in a predetermined wavelength band (1550-nm band, for example) and outputting it is provided on the output side of the output mixer 17. On the output side of the first optical transmitter 18, there are provided in this order optical fiber amplifiers 19 for amplifying the optical transmission signal output from the first optical transmitter 18 and optical splitters 20 for dividing the optical transmission signal output from the optical fiber amplifier 19 into a predetermined number. Pairs of an optical fiber amplifier 19 and an optical splitter 20 connected in series are arranged of which number corresponds to the necessary number of division.

The network center sending facility 10 further includes a 2 distributor that divides the audio information signal input in the output mixer 17 and a second optical transmitter 22 as an audio information optical transmitter that converts the audio information signal divided by the 2 distributor 21 into an optical transmission signal in a predetermined wavelength band (1310-nm band, for example) different from that in the first optical transmitter 18 and outputs it. A 16 distributor 23 that divides the audio information signal input from the 2 distributor 21 into 16 signals is provided on the divided output side of the 2 distributor 21. On the output side of the 16 distributor 23, three are provided in this order an RF amplifier 24 that amplifies the audio information signal output from the 16 distributor 23 and a 32 distributor 25 that divides the 16 audio information signals amplified by the RF amplifier 24 into 32 signals. The audio information signals output from the 32 distributor 25 are input to the second optical transmitter 22. Pairs of the 16 distributor 23 and the RF amplifier 24 are arranged of which number corresponds to the necessary number of division.

In addition, an optical splitter 26 is provided on the output side of the second optical transmitter 22 for dividing the optical transmission signal output from the second optical transmitter 22 into a predetermined number of optical transmission signals. The optical transmission signals output from the optical splitter 26 are sent out to the optical transmission line 30. It is noted that in the present embodiment, the optical transmission signal from the first optical transmitter 18 and the optical transmission signal from the second optical transmitter 22, which have wavelength bands different from each other, can be sent out even in the case where the optical transmission line 30 is formed of a single-core optical fiber.

On the other hand, there is provided in each subscriber's facility 40 a first optical receiver 41 as a TV optical receiver for receiving the optical transmission signal transmitted through the optical transmission line 30 and converting it again into a TV electric signal. A set-top box 42 for receiving the TV electric signal output from the first optical receiver 41 is connected on the output side of the first optical receiver 41, and a TV set 43 is connected to the first optical receiver 41 via the set-top box 42. Each subscriber's facility 40 is provided with an AC power source environment 44 from which electric power is supplied to the first optical receiver 41 via an AC power source adaptor 45 as well as to the set-top box 42 and the TV set 43. Further, each subscriber's facility 40 is provided with an announcement broadcasting terminal 46 for performing announcement broadcasting, such as an FM radio or the like. A dry battery or a storage battery as a power source is built in the announcement broadcasting terminal 46 so that the announcement broadcasting terminal 46 is operated with the electric energy of the built-in power source upon receipt of an audio information electric signal at an appropriate voltage level (60±10 dBµV, for example).

Figure 2:
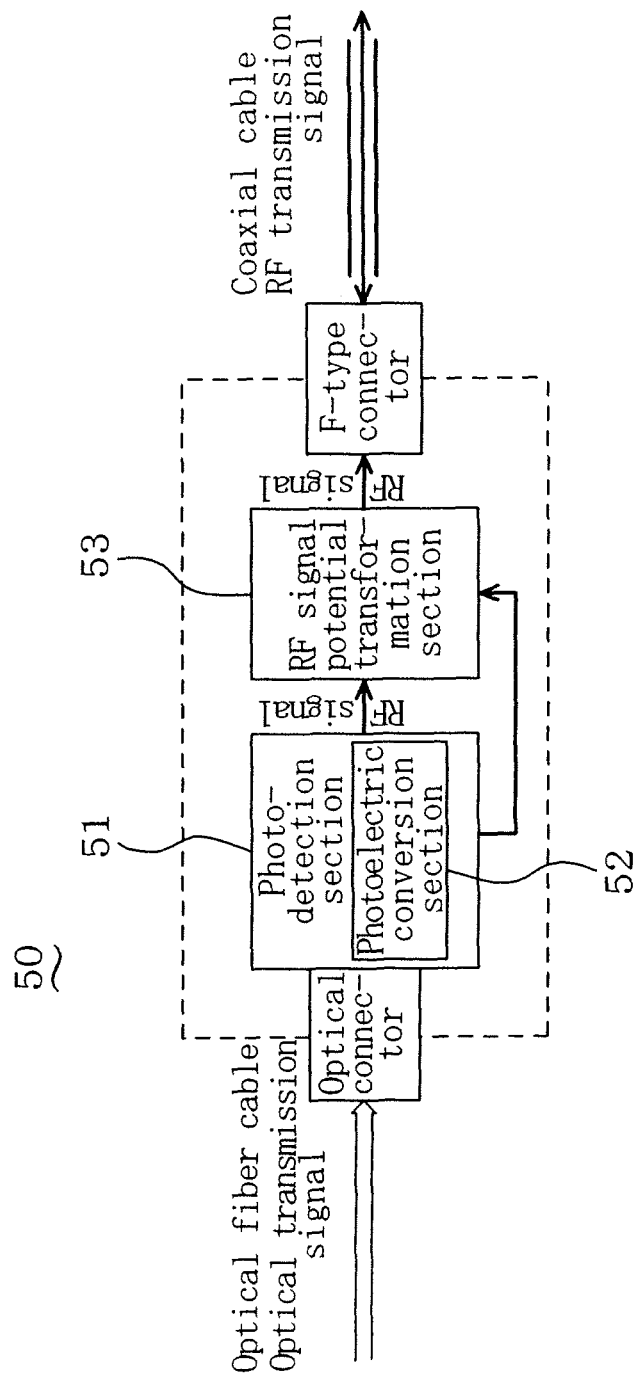
FIG. 2 is a block diagram showing a construction of a second optical receiver of a subscriber's facility.

In the present embodiment, a second optical receiver 50 as an announcement broadcasting receiver is provided in each subscriber's facility 40 for receiving the optical transmission signal sent out from the second optical transmitter 22 of the network center sending facility 10. The second optical receiver 50 includes, as shown in FIG. 2, a photo-detection section 51, a photoelectric conversion section 52, and an RF signal potential transformation section 53. The photo-detection section 51 converts the optical transmission signal that the second optical receiver 50 receives into an audio information electric signal (an RF signal). The photoelectric conversion section 52, which is connected to the photo-detection section 51, converts the optical transmission signal that the photo-detection section 51 receives into electric energy. The RF signal potential transformation section 53 potential-transforms the audio information electric signal output from the photo-detection section 51 to one at an input voltage level appropriate to the announcement broadcasting terminal 46 and outputs it. The RF signal potential transformation section 53 is operated with the electric energy obtained by the photoelectric conversion section 52. Unlike the conventional one, the announcement broadcasting terminal 46 receives an output from the second optical receiver 50 directly, not via any distributor.

In the thus constructed announcement broadcasting system, the TV optical transmission signal, which is sent out from the first optical transmitter 18 of the network center sending facility 10, is received by the first optical receiver 41 of each subscriber's facility 40 to be input into the TV set 43 via the set-top box 42. On the other hand, the optical transmission signal for audio information, which is sent out from the second optical transmitter 22 of the network center sending facility 10, is received by the second optical receiver 50 of each subscriber's facility 40, and the output signal of the second optical receiver 50 is input directly into the announcement broadcasting terminal 46. Upon receipt, the second optical receiver 50 converts the thus received optical transmission signal into the electric energy in the photoelectric conversion section 52 so as to be operated with the thus converted electric energy. In this way, the optical receiver 50 converts the optical transmission signal into the audio information electric signal and outputs it independently of power supply from not only the AC power source environment 44 but also any external battery. In the case where the output level of the RF signal of the second optical receiver 50 is lower than the appropriate level, the modulation degree of the second optical transmitter 22 of the network center sending facility 10 is adjusted (to 20%, for example) to improve the strain characteristics of the second optical transmitter 22, thereby obtaining the RF output signal of the second optical receiver 50 at the appropriate level.

Accordingly, in the present embodiment, the announcement broadcasting system includes: the network center sending facility 10 which sends out the optical transmission signal into which the TV electric signal obtained by mixing the TV image signal and the audio information signal by the output mixer 17 is converted by the first optical transmitter 18 and which sends out the optical transmission signal obtained by dividing the audio information signal input in the output mixer 17 by the 2 distributor 21 and then converting the thus divided one by the second optical transmitter 22; the optical transmission line 30 which transmits the optical transmission signals sent out from the first optical transmitter 18 and the second optical transmitter 22 of the network center sending facility 10; and the subscriber's facilities 40 each of which includes the first optical receiver 41 which receives the optical transmission signal from the first optical transmitter 18 transmitted through the optical transmission line 30 to output the TV electric signal and the announcement broadcasting terminal 46 which receives the audio information electric signal into which the optical transmission signal transmitted through the optical transmission line 30 from the second optical transmitter 22 is converted for performing announcement broadcasting, wherein each subscriber's facility 40 includes, as the second optical receiver 50 which receives the optical transmission signal sent out from the second optical transmitter 22 of the network center sending facility 10 and outputs the audio information electric signal; the photo-detection section 51 for converting the optical transmission signal into the audio information electric signal; the photoelectric conversion section 52, which is connected to the photo-detection section 51, for converting the optical transmission signal that the photo-detection section 51 receives into the electric energy; and the RF signal potential transformation section 53, to which the electric energy obtained by the photoelectric conversion section 52 is supplied, for potential-transforming the audio information electric signal output from the photo-detection section 51 to one at an input voltage level appropriate to the announcement broadcasting terminal 46 to output it. Hence, the received optical transmission signal can be converted into the electric energy, so that the audio information electric signal at the appropriate voltage level can be output with the thus converted electric energy. As a result, operation is attained independently of power supply from any external power sources, thereby ensuring the announcement broadcasting services even in outage.

Embodiment 2

Figure 3:
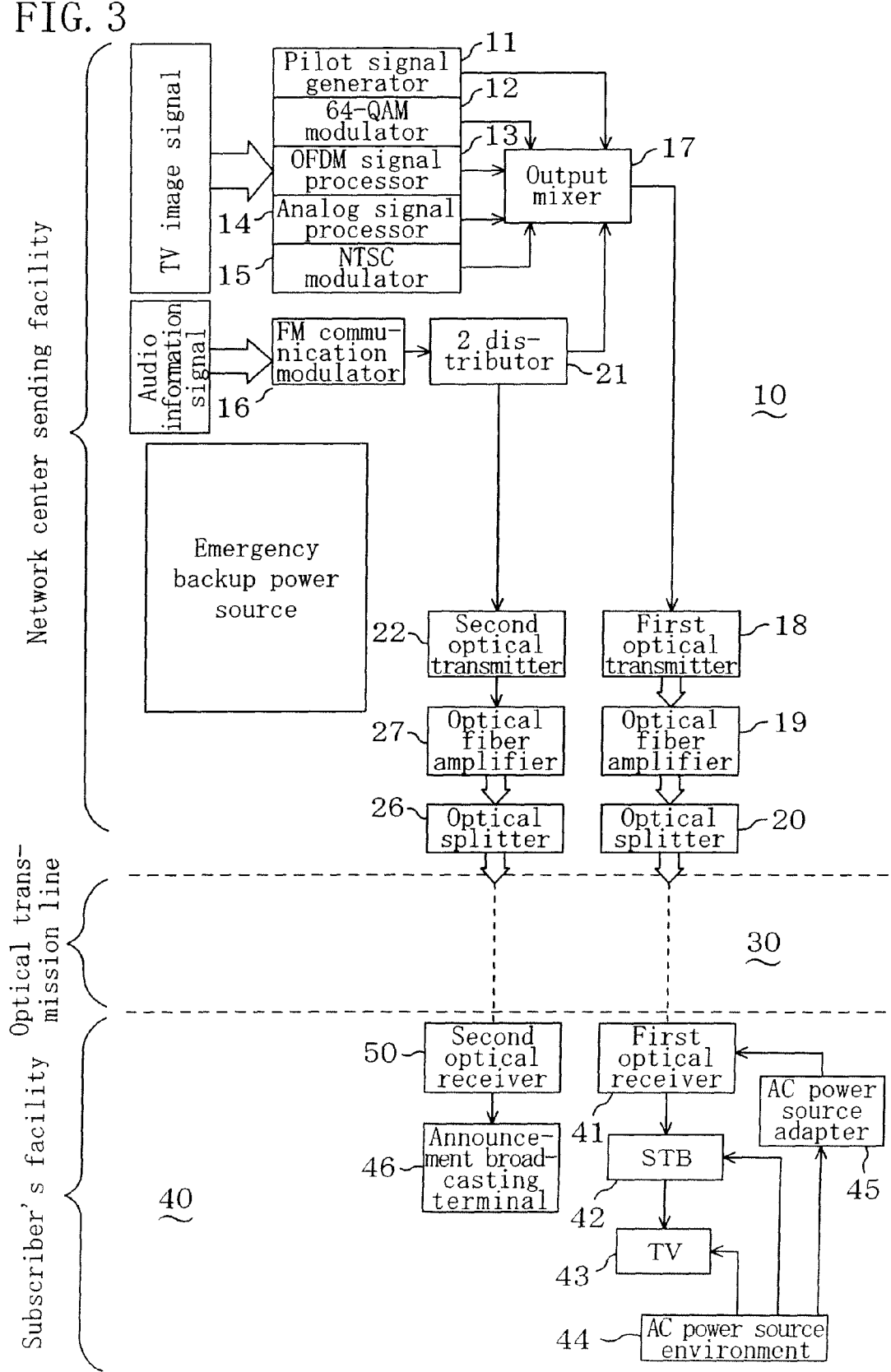
FIG. 3 is a diagram corresponding to FIG. 1 and showing a whole construction of an announcement broadcasting system in accordance with Embodiment 2 of the present invention.

FIG. 3 shows a whole construction of an announcement broadcasting system in accordance with Embodiment 2 of the present invention. This announcement broadcasting system is built by utilizing a CATV network using an optical fiber cable, similarly to Embodiment 1. The same reference numerals are assigned to the same elements as those in Embodiment 1.

In the present embodiment, the optical transmission line 30 is formed of a two-core optical fiber cable. In the network center sending facility 10, the 16 distributor 23, the RF amplifier 24, and the 32 distributor 25 are omitted while an optical fiber amplifier 27 for amplifying the optical transmission signal output from the second optical transmitter 22 is provided on the output side of the second optical transmitter 22. The optical splitter 26 receives an output signal from the optical fiber amplifier 27. The second optical transmitter 22 converts the audio information electric signal divided by the 2 distributor 21 into the optical transmission signal in the same wavelength band (1550 nm-band in the present embodiment) as that of the first optical transmitter 18. For this reason, the optical transmission line 30 is formed of the two-core optical fiber cable so as to transmit the optical transmission signal from the first optical transmitter 18 and the optical transmission signal from the second optical transmitter 22 through core wires thereof different from each other. The structures including the structure of the second optical receiver 50 other than the above elements are the same as those in Embodiment 1, and therefore, the description thereof is omitted.

Accordingly, the present embodiment can obtain the same effect as those obtained in Embodiment 1.

Embodiment 2 describes the case using the optical transmission line 30 formed of the two-core optical fiber cable. While in the case where the optical transmission line 30 is formed of a single-core optical fiber cable, provision of an additional WDM filter or the like can avoid mutual interference between the optical transmission signal for CATV and the optical transmission signal including an audio signal for the announcement broadcasting.

Embodiment 3

Figure 4:
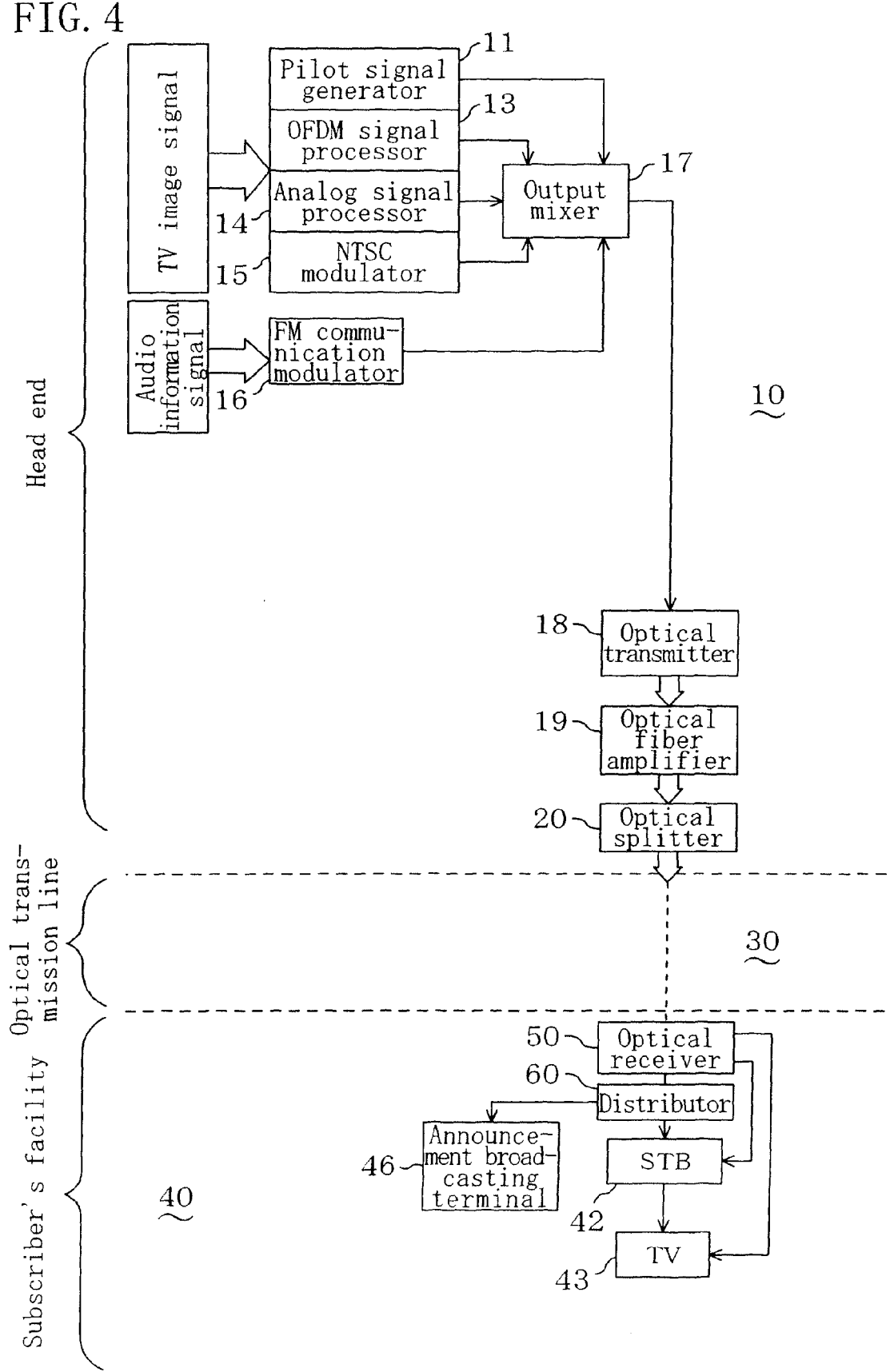
FIG. 4 is a block diagram showing a whole construction of a CATV broadcasting system in accordance with Embodiment 3 of the present invention.

FIG. 4 shows a whole construction of a CATV broadcasting system in accordance with Embodiment 3 of the present invention. This CATV broadcasting system is built by utilizing an optical fiber cable.

This CATV broadcasting system includes a head end 10 as a sending side facility, an optical transmission line 30, and a plurality of subscriber's facilities 40 as receiving side facilities. The head end 10 sends a TV optical transmission signal obtained by mixing a TV image signal (a ground wave digital TV signal) and an audio information signal (a TV audio signal, an FM radio broadcasting audio information signal, an announcement broadcasting audio information signal, or the like). The optical transmission line 30, which is formed of a two-core optical fiber, transmits the optical transmission signal sent out from the head end 10. Each of the subscriber's facilities 40 receives the optical transmission signal transmitted through the optical transmission line 30 to perform various kinds of TV broadcasting and radio broadcasting. Wherein, FIG. 4 shows only one subscriber's facility 40.

The head end 10 includes various kinds of modulators for modulating the TV image signal input through an antenna or the like, such as a pilot signal generator 11, an OFDM signal processor 13, an analog signal processor 14, an NTSC modulator 15, and the like. The frequency band of the TV image signal ranges between 90 and 770 MHz, for example. The head end 10 further includes an FM communication modulator 16 for modulating the audio information signal input through an antenna or the like. The frequency band of the audio information signal ranges between 70 and 90 MHz, for example.

On the output side of the modulators and the like 11, 13 to 16, an output mixer 17 for mixing the output signals of the modulators 11, 13 to 16 to output the TV electric signal is provided. An optical transmitter 18 for converting the TV electric signal output from the output mixer 17 into an optical transmission signal in a predetermined wavelength band (1550-nm band, for example) to output it is provided on the output side of the output mixer 17. On the output side of the optical transmitter 18, there are provide in this order optical fiber amplifiers 19 for amplifying the optical transmission signal output from the optical transmitter 18 and optical splitters 20 for dividing the optical transmission signal output from the optical fiber amplifier 19 into a predetermined number. Pairs of an optical fiber amplifier 19 and an optical splitter 20 connected in series are arranged of which number corresponds to the necessary number of division.

On the other hand, each of the subscriber's facilities 40 is provided with an optical receiver 50 for receiving the optical transmission signal transmitted through the optical transmission line 30 and converting it again into a TV electric signal. A set-top box 42 into which the TV electric signal output from the optical receiver 50 is input is connected on the output side of the optical receiver 50, to which a TV set 43 is connected via the set-top box 42. Each subscriber's facility 40 further includes an announcement broadcasting terminal 46 for performing announcement broadcasting, such as an FM radio or the like. The announcement broadcasting terminal 46, in which a dry battery or a storage battery is built as a power source, is operated with the electric energy of the thus built power source upon receipt of an audio information electric signal at an appropriate voltage level (60±10 dBμV, for example). Further, a distributor 60 for extracting the audio information electric signal from the TV electric signal output from the optical receiver 50 is provided on the output side of the optical receiver 50 so that the audio information electric signal output from the distributor 60 is input into the announcement broadcasting terminal 46.

In the present embodiment, the optical receiver 50 of each subscriber's facility 40 includes, substantially similarly to that in Embodiment 1 (see FIG. 2), a photo-detection section 51, a photoelectric conversion section 52, and an RF signal potential transformation section 53. The photo-detection section 51 converts the optical transmission signal into the TV electric signal. The photoelectric conversion section 52, which is connected to the photo-detection section 51, converts the optical transmission signal that the photo-detection section 51 receives into electric energy. The RF signal potential transformation section 53, to which the electric energy obtained by the photoelectric conversion section 52 is supplied, potential-transforms the TV electric signal output from the optical receiver 51 to one at an appropriate input voltage level to output it. The electric energy obtained by the photoelectric conversion section 52 of the optical receiver 50 is supplied also to the set-top box 42 and the TV set 43 in addition to the RF signal potential transformation section 53 of the optical receiver 50. In other words, in the present embodiment, the optical receiver 50, the set-top box 42, and the TV set 43 are operated only with the electric energy into which the optical transmission signal input in the optical receiver 50 is converted.

Figure 5:
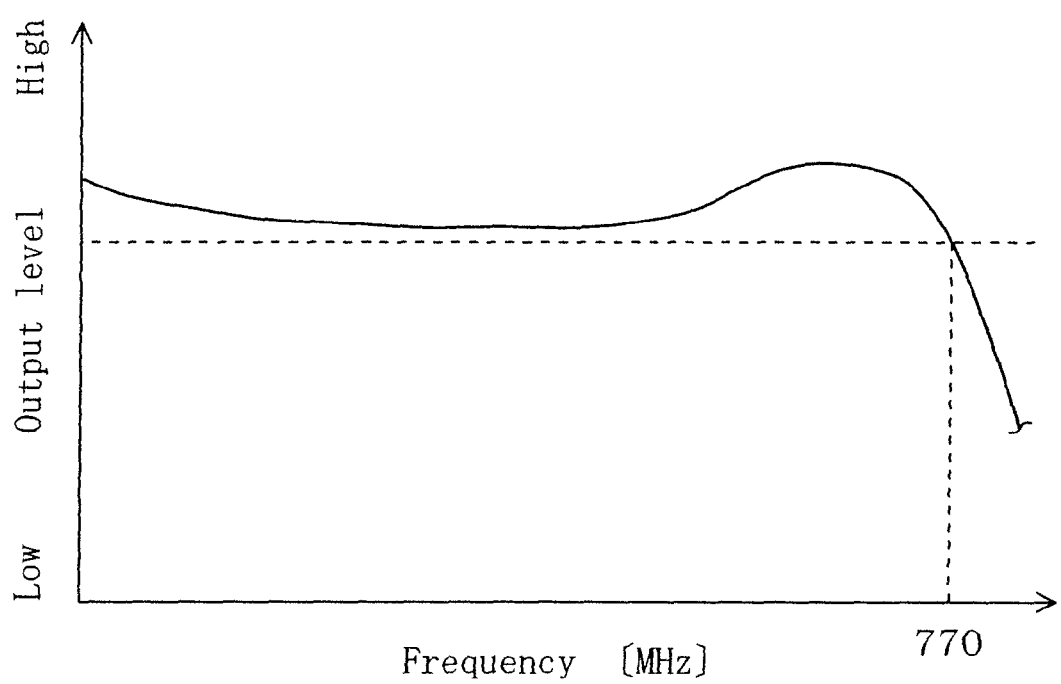
FIG. 5 is a graph schematically showing an output characteristic of a photoelectric conversion section of the optical receiver.

FIG. 5 schematically shows the relationship between the frequency of the input optical transmission signal and the output level of the electric energy in the photoelectric conversion section 52. In the present embodiment, an appropriate output level is attained which exceeds the reference level (the level indicated by the broken line extending right and left in FIG. 5) within the range of the substantial upper limit (approximately 770 MHz) of the frequency band of the optical transmission signal, and hence, the optical transmission signal can be converted into the electric energy efficiently.

In the thus constructed CATV broadcasting system, the TV optical transmission signal sent out from the optical transmitter 18 of the head end 10 is received by the optical receiver 50 of each subscriber's facility 40 and is then input into the TV set 43 via the set-top box 42. Upon receipt thereof, the optical receiver 50 converts the received optical transmission signal into the electric energy in the photoelectric conversion section 52 to operate the three elements of the optical receiver 50, the set-top box 42, and the TV set 43 with the thus converted electric energy. Accordingly, unlike the conventional cases, the image and the sound can be regenerated on the basis of the TV electric signal independently of power supply from not only the AC power source environment but also any external battery. In the case where the output level of the RF signal of the optical receiver 50 is lower than the appropriate level, adjustment of the modulation degree of the optical transmitter 18 of the head end 10 improves the strain characteristics of the optical transmitter 17, thereby attaining the RF output signal of the optical receiver 50 at the appropriate level in each subscriber's facility 40.

Thus, the CATV broadcasting system in the present embodiment includes: the head end 10 for sending out the optical transmission signal into which the TV electric signal obtained by mixing the TV image signal and the audio signal (the TV audio signal or the audio information signal) is converted by the optical transmitter 18; the optical transmission line 30 for transmitting the optical transmission signal sent out from the head end 10; and the plurality of subscriber's facilities 40 each including the optical receiver 50 that converts the optical transmission signal transmitted through the optical transmission line 30 into the TV electric signal, wherein the photoelectric conversion section 52 for converting the optical transmission signal that the optical receiver 50 of each subscriber's facility 40 receives into the electric energy supplies the electric energy to the set-top box 42 and the TV set 43 of each subscriber's facility 40. Hence, a TV program can be broadcasted independently of power supply from any emergency power source even in outage, thereby reducing installation cost and operation cost for the subscriber's facilities 40.

Embodiment 3 describes the case using the optical transmission line 30 formed of the two-core fiber cable. In the case where the optical transmission line 30 is formed of a single-core optical fiber cable, provision of an additional WDM filter or the like can avoid mutual interference between the optical transmission signal for CATV broadcasting and the optical transmission signal including an audio signal for announcement broadcasting.

Further, though the photoelectric conversion section 52 of the optical receiver 50 supplies the electric power to the optical receiver 50, the set-top box 42, and the TV set 43 in Embodiment 3, any target device to which the electric power is supplied may be set appropriately.

Embodiment 4

Figure 6:
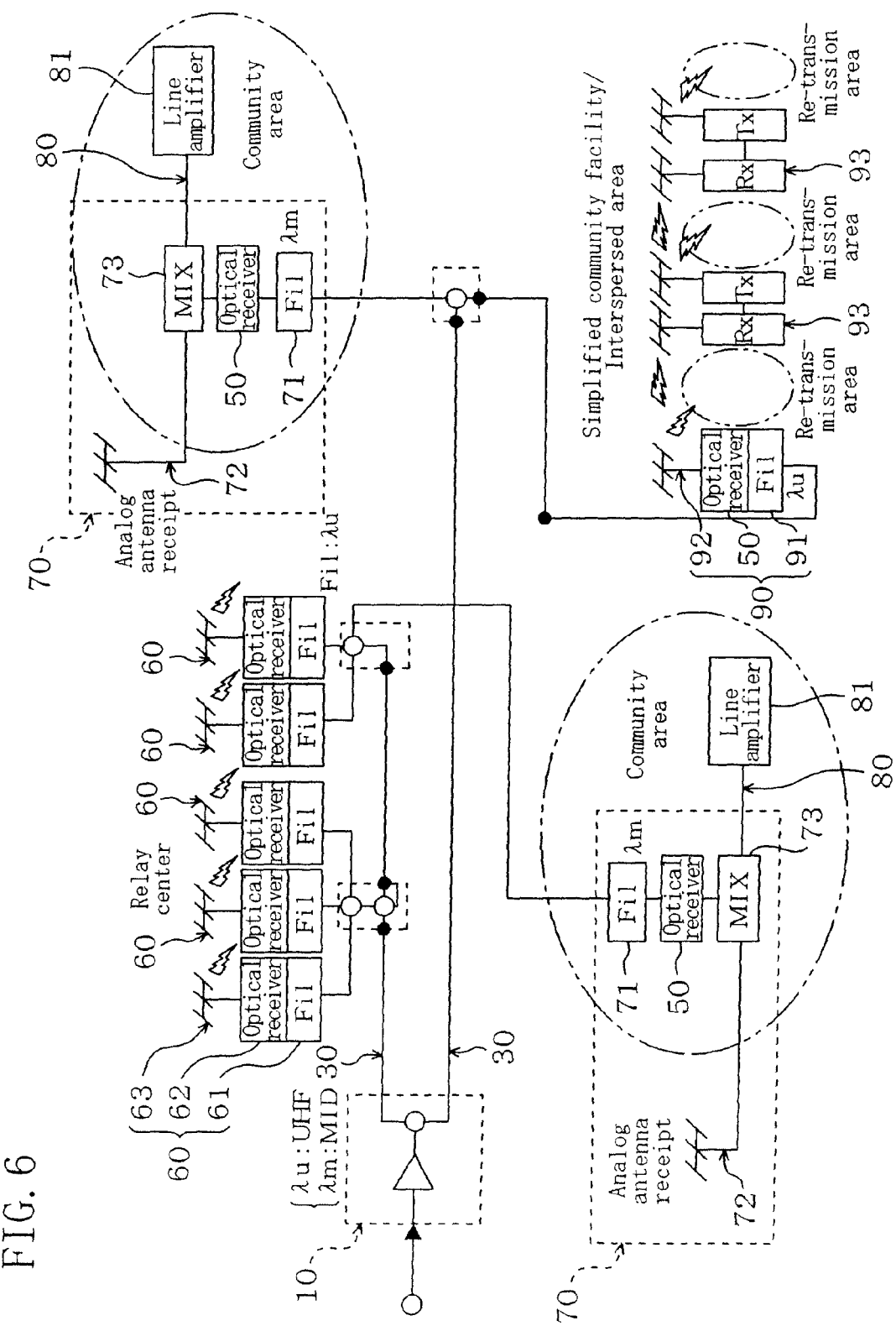
FIG. 6 is a block diagram showing a whole construction of a CATV broadcasting system in accordance with Embodiment 4 of the present invention.
Figure 7:
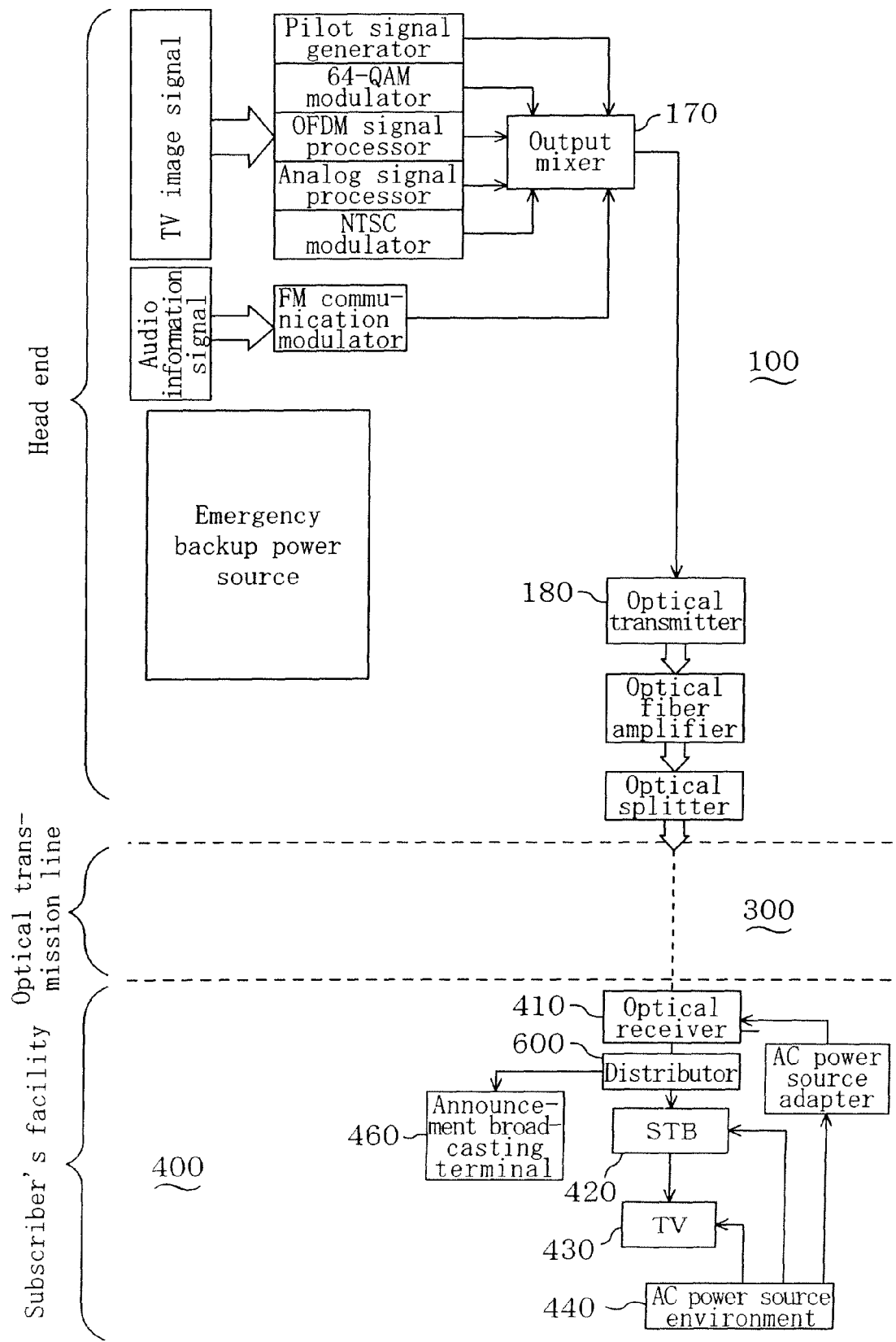
FIG. 7 is a diagram corresponding to FIG. 1 and showing a whole construction of a conventional CATV broadcasting system.

FIG. 6 shows a whole construction of a CATV broadcasting system in accordance with Embodiment 4 of the present invention. Similarly to that of Embodiment 1, this CATV broadcasting system is built by utilizing an optical fiber cable. The same reference numerals are assigned to the same element as those in Embodiment 1.

In the example shown in the drawing, a head end 10 is provided which sends out a broadband TV electric signal in two transmission bands (a UHF band and a MID band, for example) obtained by mixing an image signal and an audio signal. Two optical transmission lines 30 each formed of an optical fiber cable extend from the head end 10. Six relay centers 60 and one community facility 70 are arranged in the middle of one of the optical transmission lines 30 while one communication facility 70 and one simplified community facility 90 are arranged in the middle of the other optical transmission line 30.

Each of the relay centers 60 includes: a UHF band filter 61 for filtering the optical transmission signal transmitted through the one optical transmission lines 30; an optical receiver 62 for converting the optical transmission signal in the UHF band output from this filter 61 into a TV electric signal; and a sender 63 for sending an electric wave of the TV electric signal.

Each of the community facilities 70 includes: an MID band filter 71 for filtering the optical transmission signal transmitted through either optical transmission line 30; an optical receiver 50 for converting the optical transmission signal in the MID band output from this filter 71 into a TV electric signal and outputting it; an analog receiver 72 for receiving the electric wave of an analog TV electric signal and outputting the analog TV electric signal; and a mixer 73 for mixing the two signals of the digital and analog TV electric signals and outputting it. Optical transmission lines 80 formed of coaxial cables extend from the community facilities 70 to a plurality of subscriber's facilities (not shown) in respective community areas that the respective community facilities 70 cover. At one or each plural point in the middle of each optical transmission line 80, a line amplifier 81 is provided for amplifying the optical transmission signal.

The simplified community facility 90 is provided for an area where the plurality of subscriber's facilities are interspersed and includes: a UHF band filter 91 for filtering the optical transmission signal transmitted through the other optical transmission line 30, an optical receiver 50 for converting the optical transmission signal in the UHF band output from this filter into a TV electric signal; and a sender 92 for transmitting the electric wave of this TV electric signal to the plurality of subscriber's facilities (not shown) in the interspersed area that the simplified community facility 90 covers. The interspersed area is divided into a plurality of re-transmission areas, in each of which a re-transmission facility 93 for receiving and re-transmitting the electric wave of the TV electric signal is provided.

In the present embodiment, similarly to Embodiment 3 (see FIG. 2), each of the optical receivers 50 of the community facilities 70 and the simplified community facility 90 includes: a photo-detection section 51 for converting the optical transmission signal into the TV electric signal; a photoelectric conversion section 52, which is connected to the photo-detection section 51, for converting the optical transmission signal that the photo-detection section 51 receives into electric energy; and an RF signal potential transformation section 53, to which the electric energy obtained by the photoelectric conversion section 53 is supplied, for potential-transforming the TV electric signal output from the photo-detection section 51 to one at an appropriate voltage level and outputting it. The optical receiver 50 is operated with the electric energy obtained by the photoelectric conversion section 52.

Further, in addition to the optical receiver 50, the sender 92 of the simplified community facility 90 is operated with the electric energy obtained by the photoelectric conversion section 52 of the optical receiver 50.

Accordingly, in the present embodiment, the CATV broadcasting system includes: the head end 10 that converts the TV electric signal obtained by mixing the image signal and the audio signal into the optical transmission signal to output it; the optical transmission lines 30 that transmit the optical transmission signal sent out from the head end 10; and three community facilities 70, 90 each including the optical receiver 50 for converting the optical transmission signal transmitted through the optical transmission lines 30 into the TV electric signal for the plurality of subscriber's facilities, wherein the photoelectric conversion section 52 for converting the optical transmission signal that the optical receiver 50 receives into the electric energy supplies the thus converted electric power to the optical receiver 50 in each community facility 70, 90, so that the TV electric signal can be output independently of power supply from an emergency power source even in outage. Particularly, in the simplified community facility 90, the photoelectric conversion section 52 supplies the electric power to the sender 92 in addition. Hence, the installation cost and the operation cost of the community facilities 70, 90 can be reduced thereby.

Although the photoelectric conversion section 52 of each optical receiver 50 supplies the electric power to the optical receiver 50 itself (and the sender 92 in the simplified community facility 90) in Embodiment 4, any target device to which the electric power is supplied may be set appropriately.

In addition, the photoelectric conversion section 52 of each optical receiver 50 supplies the electric power both in services and in emergency in Embodiments 3 and 4, but may supply it in only one of the services and the emergency (backup power source) limitedly.

What is claimed is:

1. An announcement broadcasting system comprising:
  a network center sending facility including: a mixer for mixing a TV image signal and an audio information signal and outputting a TV electric signal; a TV optical transmitter for converting the TV electric signal output from the mixer into an optical transmission signal and outputting it; a distributor for dividing the audio information signal input in the mixer; and an audio information optical transmitter for converting the audio information signal divided by the distributor into an optical transmission signal and outputting it;
  an optical transmission line for transmitting the optical transmission signals sent out from the TV optical transmitter and the audio information transmitter of the network center sending facility; and
  at least one subscriber's facility including: a TV optical receiver for receiving the optical transmission signal transmitted from the TV optical transmitter through the optical transmission line and outputting a TV electric signal; and an announcement broadcasting optical receiver for converting the optical transmission signal transmitted from the audio information optical transmitter through the optical transmission line into an audio information signal and outputting it so that the audio information electric signal is input to an announcement broadcasting terminal for performing announcement broadcasting,
  wherein the announcement broadcasting receiver of the subscriber's facility includes:
    a photo-detection section for converting the optical transmission signal sent out from the audio information optical transmitter of the network center sending facility into the audio information electric signal;
    a photoelectric conversion section, which is connected to the photo-detection section, for converting the optical transmission signal that the photo-detection section receives into electric energy; and
  an RF signal potential transformation section, to which the electric energy obtained by the photoelectric conversion section is supplied, for potential-transforming the audio information electric signal output from the photo-detection section to one at an input voltage level appropriate to the announcement broadcasting terminal and outputting it.

2. In an announcement broadcasting system including: a network center sending facility which sends out an optical transmission signal into which a TV electric signal obtained by mixing a TV image signal and an audio information signal by a mixer is converted by a TV optical transmitter and which sends out an optical transmission signal obtained by dividing by a distributor and then converting by an audio information optical transmitter the audio information signal input in the mixer; an optical transmission line which transmits the transmission signals sent out from the TV optical transmitter and the audio information optical transmitter of the network center sending facility; and at least one subscriber's facility which receives the optical transmission signal transmitted from the TV optical transmitter through the optical transmission line to output a TV electric signal, which inputs into an announcement broadcasting terminal an audio information electric signal into which the optical transmission signal transmitted from the audio information optical transmitter through the optical transmission line is converted for performing announcement broadcasting, and which includes an announcement broadcasting optical receiver which receives the optical transmission signal from the audio information optical transmitter and outputs the audio information electric signal, the announcement broadcasting optical receiver, comprising:
  a photo-detection section for converting the optical transmission signal sent out from the audio information optical transmitter of the network center sending facility into the audio information electric signal;
  a photoelectric conversion section, which is connected to the photo-detection section, for converting the optical transmission signal that the photo-detection section receives into electric energy; and
  an RF signal potential transformation section, to which the electric energy obtained by the photoelectric conversion section is supplied, for potential-transforming the audio information electric signal output from the photo-detection section to one at an input voltage level appropriate to the announcement broadcasting terminal and outputting it.

3. An announcement broadcasting optical receiver which is provided in at least one subscriber's facility for an announcement broadcasting system which performs announcement broadcasting by inputting an optical transmission signal transmitted through an optical transmission line into an announcement broadcasting terminal, and which receives an optical transmission signal into which an audio information signal in an FM frequency band is converted and outputs an audio information electric signal in the FM frequency band, the announcement broadcasting optical receiver, comprising:

a photo-detection section for converting the optical transmission signal into the audio information electric signal in the FM frequency band;

a photoelectric conversion section, which is connected to the photo-detection section, for converting the optical transmission signal that the photo-detection section receives into electric energy; and an RF signal potential transformation section, to which the electric energy obtained by the photoelectric conversion section is supplied, for potential-transforming the audio information electric signal in the FM frequency band output from the photo-detection section to one at an input voltage level appropriate to the announcement broadcasting terminal and outputting it.

4. The announcement broadcasting optical receiver of claim 3, wherein the FM frequency band ranges between 70 and 90 MHz.

5. A cable TV broadcasting system, comprising:

a sending side facility including an optical transmitter for converting a TV electric signal obtained by mixing an image signal and an audio signal into an optical transmission signal and outputting it;

an optical transmission line for transmitting the optical transmission signal sent out from the sending side facility; and at least one receiving side facility including an optical receiver for converting the optical transmission signal transmitted through the optical transmission line into a TV electric signal and outputting it, wherein the optical receiver of the receiving side facility includes a photoelectric conversion section for converting the optical transmission signal that the optical receiver receives into electric energy so as to be operated with the electric energy obtained by the photoelectric conversion section.

6. The cable TV broadcasting system of claim 5, wherein the receiving side facility is a subscriber's facility including, in addition to the optical receiver, a TV set for regenerating an image and a sound on the basis of the TV electric signal output from the optical receiver, and the TV set is operated with the electric energy obtained by the photoelectric conversion section of the optical receiver.

7. The cable TV broadcasting system of claim 5, wherein the receiving side facility is a community facility including, in addition to the optical receiver, a sender for sending the TV electric signal output from the optical receiver to a plurality of subscriber's facilities, and the sender is operated with the electric energy obtained by the photoelectric conversion section of the optical receiver.

8. The optical receiver for a cable TV broadcasting system according to claim 5, comprising:

a photo-detection section for converting an optical transmission signal into a TV electric signal;

a photoelectric conversion section, which is connected to the photo-detection section, for converting the optical transmission signal that the photo-detection section receives into electric energy; and an RF signal potential transformation section, to which the electric energy obtained by the photoelectric conversion section is supplied, for potential-transforming the TV electric signal output from the photo-detection section to one at an appropriate voltage level and outputting it.

* * * * *